Aug. 3, 1943. P. A. SOLEM 2,326,076
RESILIENT ROLLER
Filed Dec. 12, 1940
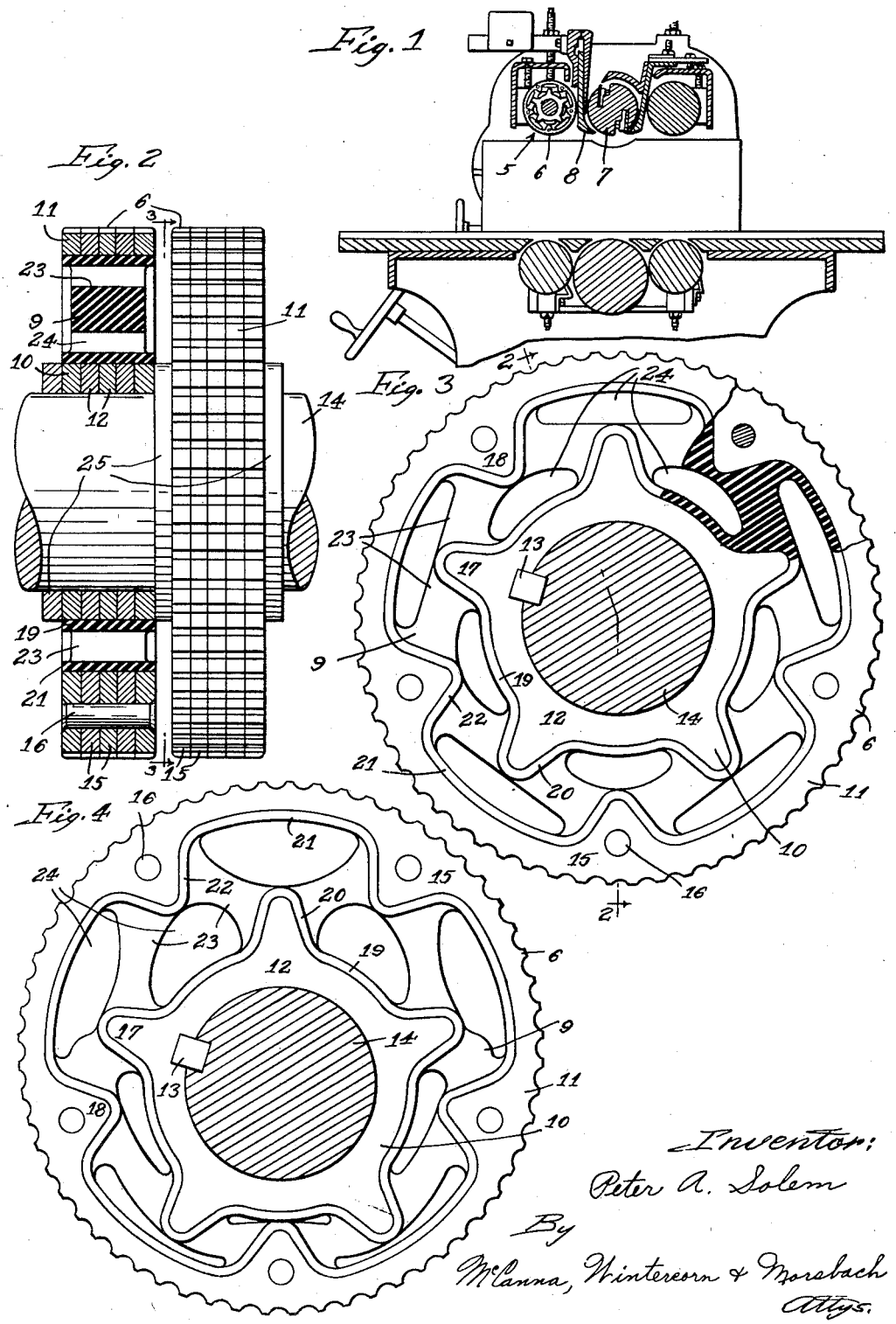
Inventor:
Peter A. Solem
By
McCanna, Wintercorn & Morsbach
Attys.

Patented Aug. 3, 1943

2,326,076

UNITED STATES PATENT OFFICE 2,326,076

RESILIENT ROLLER

Peter A. Solem, Rockford, Ill.

Application December 12, 1940, Serial No. 369,870

3 Claims. (Cl. 144—250)

This invention relates to resilient rollers especially designed for use in sectional feed rolls on woodworking machines, such as planers, but adapted to be used wherever rollers having similar characteristics may be desired. The present construction more specifically stated involves improvements on that disclosed in my copending application Serial No. 233,715, filed October 7, 1938, now Patent No. 2,254,501 of Sept. 2, 1941.

In the earlier application I disclosed a three-piece rubber cushioned roller having a single continuous rubber cushioning core forming the connecting wall or web between the hub and rim parts, the core being yieldable in all directions, that is to say, torsionally in either direction as well as radially and laterally in either direction, the core being molded in place between the hub and rim and bonded to these parts by vulcanization, so that any portion of the core may be stretched or compressed, depending upon the relative movement between the hub and rim parts.

The present invention provides a roller of the same general type but improved in these respects:

(1) The hub and rim parts are of laminated construction, each made from a series of stamped sheet metal rings riveted or otherwise suitably secured toegther, whereby rollers of any desired width may be made up with the use of more or less rings, with the further advantage that a cheaper and more desirable construction is obtained;

(2) The rings forming the hub and rim parts have radially projecting teeth provided on their outer and inner peripheries, respectively, the teeth on the hub rings extending to a radius beyond a circle defined by the inner ends of the teeth on the rim rings, so that some portions of the rubber core are compressed and other portions stretched between the inner and outer teeth when the roller is under torsional load, the rubber core being thus used to best advantage and not being subjected to twisting strains apt either to cause the core to tear loose from the rim and hub or make it break down internally; and (3) The core has continuous inner and outer walls of scalloped form to follow the toothed contours of the hub and rim parts to which they are vulcanized, the scallops of the inner wall being joined to the scallops of the outer wall by stretchable and compressible web portions molded integral with these walls, leaving openings between the inner and outer walls at the other points, with the result that a roller is obtained the rim of which is free to give to a greater degree universally with respect to the hub with less likelihood of destructive strains being imposed upon the rubber under any condition, the degree of give being variable by increasing the cross-section of the web portions and accordingly cutting down the size of the openings in the core.

The invention is illustrated in the accompanying drawing, in which—

Figure 1 is a fragmentary sectional view of a planer equipped with a sectional front feed roll made up of resilient rollers made in accordance with my invention;

Fig. 2 is a view of a portion of the sectional feed roll showing one of the rollers in elevation and the other in section on the broken line 2—2 of Fig. 3;

Fig. 3 is a section on the line 3—3 of Fig. 2 showing one of the rollers in side elevation, but with one portion thereof broken away and shown in section, and Fig. 4 is another view similar to Fig. 3, but showing the hub of the roller radially displaced relative to the rim to an extreme position, thus distorting the rubber core.

The same reference numerals are applied to corresponding parts throughout the views.

I have illustrated my invention as applied to a sectional front feed roll 5 in a planer where the torsional, radial, and lateral give of the individual resilient rollers 6 used in making up the feed roll serve to meet all requirements for efficiently feeding narrow stock of varying thicknesses and shapes to the cutter head 7 past a chip breaker 8. However, it will soon appear that resilient rollers having the novel characteristics of the ones herein disclosed are adapted for a wide variety of purposes when made in different diameters and widths to suit the requirements of such other uses. In other words I contemplate the general application of resilient rollers constructed along the lines herein disclosed, wherever a rubber core 9 is suitable between the hub 10 and rim 11 of the roller.

The hub 10, in accordance with my invention, is of laminated construction and made up of a number of stamped sheet metal rings 12 riveted, welded, or otherwise suitably secured together to form a unitary hub part adapted to be keyed, as indicated at 13, to the shaft 14. While the shaft 14 in the case of a feed roll is the driving shaft and drive is accordingly transmitted from the hub 10 of each roller through the rubber core 9 to the rim 11, it should be understood that in certain other applications of my invention the direction of drive may be reversed and in still other applications the rollers may be mounted to rotate freely with respect to the shaft or axle on which the same are mounted. The rim 11 in like manner is of laminated construction, being made up of a number of stamped sheet metal rings 15 adapted to be riveted, welded, or otherwise suitably secured together, rivets being indicated at 16. The laminated construction of the hub and rim makes for flexibility in manufacturing, inasmuch as rollers of any width desired can be furnished by adding or omitting laminations, there being a further advantage from the standpoint of decreased cost and greater durability. The laminated hub and rim parts furthermore provide the desired roughness of surfaces which makes for better bonding of the rubber thereon. A much better bond between the rubber and the metal parts also results from the fact that the rings 12 in the hub have radially outwardly projecting teeth 17 provided thereon and the rings 15 forming the rim have radially inwardly projecting teeth 18 provided thereon, thus greatly increasing the amount of bonding surfaces over what would be afforded in ordinary circular hub and rim parts. The teeth 17, as clearly indicated in Fig. 3, extend beyond the radius of the circle touching the inner ends of the teeth 18, so that some of those portions of the core 9 coming between the teeth 17 and 18 are compressed and the rest are stretched when the shaft 14 is driven and there is any resistance to turning of the roller, as, for example, might be offered by a piece of stock contacted by the rim 11, in the case of a sectional feed roll. The core 9 is preferably of rubber molded into the roller and vulcanized to the outer periphery of the hub 10 and inner periphery of the rim 11. A good bond is obtained by brass plating the parts and then, after the core is molded in place, it is joined to the brass plated rim and hub by vulcanization. The core is molded to provide an inner peripheral wall 19 with scallops 20 to conform to the contour of the hub 10 and an outer peripheral wall 21 with scallops 22 therein to conform to the inner periphery of the rim 11, the scallop portions 20 and 22 being connected by web portions 23 molded integral with the walls 19 and 21. The walls 19 and 21 extend substantially the full width of the hub and rim as clearly appears in Fig. 2, and the web portions 23 extend nearly the full width of the roller, as shown. Openings 24 are left in the core between the inner and outer walls 19 and 21 and between the web portions 23. The web portions 23 may, of course, be made larger or smaller in cross-section than has been shown, accordingly decreasing or increasing the voids left therebetween in the core, depending upon the operating characteristics desired. The web portions 23 may also be increased or decreased in width in relation to the width of the walls 19 and 21, as desired.

In operation, the rollers when used in multiple in building up a sectional feed roll are assembled on the shaft 14 with spacing washers 25 between the hubs thereof, so that the rims of the rollers are free to yield laterally. The core 9 permits restrained universal movement of the rim 11 with respect to the hub 10. The core is yieldable in all directions and, although I have mentioned only torsional, radial, and lateral yieldability, because it is in those respects that the roller is specially adapted for use in a sectional feed roll in a planer or other woodworking machine, it should be apparent that the rim 11 may also be moved axially in either direction with respect to the hub 10 by virtue of the lateral yieldability of the core 9. Radial yieldability of the rollers is illustrated in Fig. 4 in which the hub 10 is shown in an extreme position of radial displacement and all of the web portions 23 are accordingly distorted, some being compressed and others stretched. In all cases the stresses set up in the core incident to any deflection of the rim relative to the hub are distributed substantially throughout the entire circumference of the core. An important advantage resulting from the provision of the teeth 17 and 18 is that most of the stresses set up in the core are along the longitudinal axes of the web portions, that is, the webs are compressed or stretched and there is accordingly less likelihood of the core tearing loose from the hub or rim than where the outer periphery of the hub and inner periphery of the rim are of circular form without any radial projections like the teeth 17 and 18. With the present construction I do not depend entirely upon the strength of the resilient material itself, because even though the rubber should work loose from the metal at one or more points, the roller will continue giving service, the only effect being the diminished pressure obtainable between the roller and the material being operated upon, it being obvious that when the rubber separates from the metal at a certain point the benefit of the stretching action is lost, although compression of the core at that point is still possible. The roller is preferably constructed with an odd number of projections 17 and 18 on the hub and rim, and, of course, the number of projections may be increased or decreased for various diameters and depending upon the amount of yield and flexibility desired.

It is believed the foregoing description conveys a good understanding of the objects and advantages of my invention. The appended claims have been drawn to cover all legitimate modifications and adaptations.

I claim:

1. A resilient roller of the character described comprising a laminated hub member, a laminated rim member normally concentric with the hub, said hub and rim members being built up to a desired greater or smaller width with more or less ring-shaped laminae secured together in stacked relation to form a unitary hub member and a unitary rim member, and an annular rubber core between and connected circumferentially with the hub and rim members on the outer periphery of the hub member and inner periphery of the rim member to transmit drive resiliently from one of said members to the other while permitting universal deflection of the rim with respect to the hub under restraint of the compressed, stretched, or otherwise distorted portions of said core, the laminae of said hub and rim members providing multiplicities of interstices therebetween into which the rubber of the core protrudes to make a better mechanical driving connection between the core and said hub and rim members.

2. A resilient roller of the character described comprising a hub member having a plurality of circumferentially spaced radial projections, a rim member normally in concentric relation with the hub having a plurality of radial projections disposed between the radial projections on the hub, and an annular rubber core between and connected circumferentially with the hub and rim members on the outer periphery of the hub member and inner periphery of the rim member, said core being formed to provide radially spaced inner and outer circumferentially extending walls profiled to define recesses in the inner and outer peripheries of the core receiving the radial projections on the hub and rim members, respectively, and said core being further formed to provide circumferentially spaced web portions connecting the aforesaid inner and outer walls to transmit drive resiliently from one of said hub and rim members to the other while permitting universal deflection of the rim with respect to the hub under restraint of the compressed, stretched, or otherwise distorted web portions of said core, said web portions extending in transverse relation to the radial projections on the hub and rim members and being normally spaced radially from the radially innermost portions of the inner wall and from the radially outermost portions of the outer wall of said core.

3. A resilient roller of the character described comprising a laminated hub member having a plurality of circumferentially spaced radial projections, a laminated rim member normally in concentric relation with the hub having a plurality of radial projections disposed between the radial projections on the hub, and an annular rubber core between and connected circumferentially with the hub and rim members on the outer periphery of the hub member and inner periphery of the rim member, said core being formed to provide radially spaced inner and outer circumferentially extending walls profiled to define recesses in the inner and outer peripheries of the core receiving the radial projections on the hub and rim members, respectively, and said core being further formed to provide circumferentially spaced web portions connecting the aforesaid inner and outer walls to transmit drive resiliently from one of said hub and rim members to the other while permitting universal deflection of the rim with respect to the hub under restraint of the compressed, stretched, or otherwise distorted web portions of said core, the laminae of said hub and rim members providing multiplicities of interstices therebetween into which the rubber of the core protrudes to make a better mechanical driving connection between the core and said hub and rim members.

PETER A. SOLEM.